United States Patent
Ellä et al.

(10) Patent No.: US 9,929,850 B2
(45) Date of Patent: Mar. 27, 2018

(54) CIRCUIT ARRANGEMENT

(71) Applicant: Snaptrack Inc., San Diego, CA (US)

(72) Inventors: Juha Ellä, Halikko (FI); Edgar Schmidhammer, Stein an der Traun (DE)

(73) Assignee: SnapTrack, Inc., San Diego, CA (US)

( * ) Notice: Subject to any disclaimer, the term of this patent is extended or adjusted under 35 U.S.C. 154(b) by 143 days.

(21) Appl. No.: 14/779,267

(22) PCT Filed: Apr. 17, 2013

(86) PCT No.: PCT/EP2013/057997
§ 371 (c)(1),
(2) Date: Sep. 22, 2015

(87) PCT Pub. No.: WO2014/169954
PCT Pub. Date: Oct. 23, 2014

(65) Prior Publication Data
US 2016/0056945 A1    Feb. 25, 2016

(51) Int. Cl.
*H01P 5/12*    (2006.01)
*H04L 5/14*    (2006.01)
*H04L 5/04*    (2006.01)
*H04B 1/525*   (2015.01)

(52) U.S. Cl.
CPC .............. *H04L 5/04* (2013.01); *H04B 1/525* (2013.01); *H04L 5/14* (2013.01)

(58) Field of Classification Search
CPC ...... H04B 1/52; H04B 1/0057; H04B 1/0064; H03H 9/70; H04L 5/04; H04L 5/14
USPC ........................................................ 333/117
See application file for complete search history.

(56) References Cited

U.S. PATENT DOCUMENTS

| 5,386,203 A | 1/1995 | Ishihara |
| 6,748,197 B2* | 6/2004 | Lindemann ............ H04B 1/005 342/352 |
| 7,821,355 B2* | 10/2010 | Engel ...................... H01P 1/211 333/117 |
| 8,022,787 B2* | 9/2011 | Inoue ...................... H01P 1/213 333/110 |

(Continued)

FOREIGN PATENT DOCUMENTS

| DE | 102010046677 A1 | 3/2012 |
| DE | 112011102499 T5 | 6/2013 |

(Continued)

OTHER PUBLICATIONS

International Search Report and Written Opinion—PCT/EP2013/07997—ISA/EPO—dated Jan. 2, 2014.

*Primary Examiner* — Dean Takaoka
(74) *Attorney, Agent, or Firm* — Patterson & Sheridan, L.L.P (57) ABSTRACT

A circuit arrangement includes an antenna port, a first receiving port, a second receiving port, a first transmission port, and a second transmission port. A number of 90 degree hybrids are configured to transfer an input signal into two output signals that are phase shifted relative to each other. Two quadplexers each include a first duplexer and a second duplexer. The quadplexers and the 90 degree hybrids are interconnected such that a leakage signal travelling from one of the transmission ports to one of the receiving ports destructively interferes at the receiving port.

18 Claims, 5 Drawing Sheets

(56) References Cited

U.S. PATENT DOCUMENTS

| | | | |
|---|---|---|---|
| 8,149,742 B1* | 4/2012 | Sorsby | H04B 1/0057 |
| | | | 370/219 |
| 8,723,619 B2* | 5/2014 | Weibeta | H04B 1/52 |
| | | | 333/117 |
| 9,240,622 B2* | 1/2016 | Schmidhammer | H01P 1/213 |
| 9,548,768 B2* | 1/2017 | Khlat | H04B 1/0064 |
| 2004/0189526 A1* | 9/2004 | Frank | H04B 1/0057 |
| | | | 343/700 MS |
| 2005/0206478 A1 | 9/2005 | Satoh et al. | |
| 2007/0207748 A1 | 9/2007 | Toncich | |
| 2012/0230227 A1 | 12/2012 | Weiss | |
| 2013/0039229 A1 | 2/2013 | Park et al. | |
| 2013/0090080 A1* | 4/2013 | Schmidt | H03H 9/54 |
| | | | 455/307 |
| 2013/0141180 A1 | 6/2013 | Uejima | |
| 2013/0234806 A1 | 9/2013 | Schmidhammer et al. | |
| 2014/0003300 A1* | 1/2014 | Weissman | H04B 1/0064 |
| | | | 370/273 |
| 2016/0056945 A1* | 2/2016 | Ella | H04B 1/525 |
| | | | 370/273 |
| 2017/0077986 A1* | 3/2017 | Ella | H04B 1/0458 |

FOREIGN PATENT DOCUMENTS

| | | | | |
|---|---|---|---|---|
| JP | 2014528193 A | 10/2014 | | |
| WO | 2006071005 A1 | 7/2006 | | |
| WO | WO 2012041739 A1 * | 4/2012 | | H01P 1/213 |
| WO | WO 2014169954 A1 * | 10/2014 | | H04B 1/525 |
| WO | WO 2016016691 A1 * | 2/2016 | | H04B 1/525 |

\* cited by examiner

CIRCUIT ARRANGEMENT

This patent application is a national phase filing under section 371 of PCT/EP2013/057997, filed Apr. 17, 2013, which is incorporated herein by reference in its entirety.

TECHNICAL FIELD

The present invention concerns a circuit arrangement comprising an antenna port, a first receiving port, a second receiving port, a first transmission port and a second transmission port.

BACKGROUND

Rx interband carrier aggregation is required by some mobile phone standards, e.g., by LTE-advanced. Rx interband carrier aggregation requires two Rx paths at different frequency bands to be active simultaneously, thereby providing a higher downlink data rate. Thus, carrier aggregation increases the reception bandwidth.

Moreover, standards like LTE and WCDMA and their cellular front end implementations set stringent requirements for the Tx to Rx isolation of a duplexer in order for the own Tx not to desensitize the corresponding Rx port. Furthermore, a cellular phone can only support carrier aggregation, if the same Tx to Rx isolation requirement is expanded also to the isolation between the main Tx port and the aggregated Rx port.

As an example, a situation is considered wherein the main operating band with both Tx port and Rx port is band 2 and the aggregated band is band 4. In this case it is equally important to provide a good isolation from the band 2 Tx port to band 2 Rx port and to provide a good isolation from the band 2 Tx port to band 4 Rx port.

In particular, for band pairs that are located close to each other in frequency, this problem cannot be solved by connecting the antenna with a diplexer because a diplexer cannot sufficiently separate frequencies in bands that are close to each other. Such band pairs are formed, for example, by bands 8 and 20 or by bands 2 and 4.

Carrier aggregation of closely spaced bands may be supported by a combination of two duplexers at the antenna port with some additional matching networks. Two duplexers combined at the antenna port and optionally with some matching structures are also referred to as a quadplexer.

However, this approach requires the redesign of the acoustic part of the duplexers so that each of the Tx parts provides a good attenuation at the two different Rx frequencies. This requires a compromise with some other parameters, e.g., Tx insertion loss, due to additional resonators or other structures in the Tx filter part of the duplexer. Thus, it is possible to realize a quadplexer with an acceptable Tx to Rx isolation. However, the Tx to aggregated Rx isolation of this quadplexer is not sufficient.

SUMMARY

Embodiments of the present invention overcome the disadvantage of a quadplexer being connected to the antenna. In particular, embodiments of the present invention propose a circuit arrangement providing a sufficient isolation between the transmission ports and both of the receiving ports, thereby supporting interband carrier aggregation.

A circuit arrangement is provided comprising an antenna port, a first receiving port, a second receiving port, a first transmission port, a second transmission port, 90 degree hybrids being configured to transfer an input signal into two output signals that are phase shifted relative to each. The circuit arrangement further comprises two quadplexers, each comprising a first and a second duplexer, wherein each quadplexer is connected to each of the 90 degree hybrids. The quadplexers and the 90 degree hybrids are interconnected such that a leakage signal travelling from one of the transmission ports to one of the receiving ports destructively interferes at the receiving port.

This circuit arrangement provides a very good isolation between the transmission ports and the receiving ports. In particular, a very good isolation is provided for signals travelling from the transmission port to any one of the first and second receiving port.

Each of the first transmission port and the second transmission port may be used as a main transmission port for carrier aggregation. Further, each of the first receiving port and the second receiving port may be used as a main receiving port for carrier aggregation, wherein the respective other receiving port is used as an aggregated receiving port.

This circuit arrangement provides a very good isolation between the transmission ports and each of the receiving ports. In particular, the main transmission port is sufficiently isolated to each of the corresponding main receiving port and the aggregated receiving port when the circuit arrangement is used for carrier aggregation.

Moreover, the duplexers allow separating frequencies in closely spaced frequency bands. Thus, the circuit arrangement allows the support of carrier aggregation for closely spaced frequency bands. Thereby, the circuit arrangement increases the reception bandwidth.

The circuit arrangement does not require extra antennas for supporting carrier aggregation.

The antenna port may be configured to be connected to an antenna. The first receiving port, the second receiving port, the first transmission port and the second transmission port may be configured to be connected to a front-end circuit.

The 90 degree hybrids are configured to transfer an input signal into two output signals that are phase shifted relative to each. Moreover, the 90 degree hybrids are configured to combine to input signals to a single output signal wherein one of the input signals is phase shifted before the two signals are combined.

The 90 degree hybrids and the quadplexers may be interconnected such that a leakage signal travelling from one of the transmission ports to one of the receiving ports is split up into two sub-signals by one of the 90 degree hybrids. Further, the circuit arrangement may be designed such that the two sub-signals may travel along different paths through the circuit arrangement and may be combined by another 90 degree hybrid such that the two sub-signals are phase shifted relative to each other and, therefore, destructively interfere at the receiving port.

In particular, the circuit arrangement may comprise five 90 degree hybrids. Each of the 90 degree hybrids may be connected to one of the antenna port, the first receiving port, the second receiving port, the first transmission port or the second transmission port. Thus, a circuit arrangement may be realized wherein a leakage signal travelling from one of the transmission ports to one of the receiving ports destructively interferes at the receiving port. Moreover, a circuit arrangement may be realized wherein a signal travelling from one of the transmission ports to the antenna port constructively interferes at the antenna port.

The first duplexer of each of the quadplexers may be adjusted to a first frequency band and the second duplexer of each of the quadplexers may be adjusted to a second frequency band which is different from the first frequency band.

In particular, the first duplexer may comprise a first and a second pass band filter. The first pass band filter may be configured to form a pass band for frequencies in the transmission band of the first frequency band. The second pass band filter may form a pass band for frequencies in the receiving band of the first frequency band. Further, the second duplexer may comprise a third and a fourth pass band filter. The third pass band filter may form a pass band for frequencies in the transmission band of the second frequency band. The fourth pass band filter may form a pass band for frequencies in the receiving band of the second frequency band.

The two quadplexers may be identical to each other. Thereby, it is ensured that two sub-signals one passing through the first quadplexer and the other passing through the second quadplexer are treated identically.

The quadplexers may further comprise a matching structure for matching the two duplexers to the antenna port. The matching structure may be a simple structure or a more elaborate structure, depending on the specific requirements. A simple matching structure may be formed by a single coil being connected to a signal path and to ground. However, the matching structure may also comprise further impedances and capacitors.

In particular, the first transmission port may be configured to transmit signals in the first frequency band. The first receiving port may be configured to receive signals in the first frequency band. The second transmission port may be configured to transmit signals in the second frequency band. The second receiving port may be configured to receive signals in the second frequency band.

One of the first and the second frequency band may be used as a main band operating with both Tx and Rx. The other of the first and the second frequency band may be used as an aggregated band for Rx. Thereby carrier aggregation for Rx is supported.

Rx interband carrier aggregation requires a main signal receiving path and an aggregated signal receiving path. The main signal receiving path may be defined from the antenna port to one of the first and the second receiving ports and the aggregated signal receiving path may be defined from the antenna port to the respective other of the first and the second receiving ports. In particular, the circuit arrangement permits that both receiving paths are active simultaneously. Thus, the circuit arrangement supports Rx interband carrier aggregation.

Each of the duplexers may comprise an unbalanced Rx port. Alternatively, each of the duplexers may comprise a balanced Rx port.

When the duplexers comprise balanced Rx ports, the first and the second receiving ports of the circuit arrangement may also be balanced.

The reason for presenting the two possible embodiments is that some chip sets require a single ended Rx filter path and others a balanced.

In the first embodiment, the duplexers comprise a single ended Rx port. In this embodiment, the circuit arrangement has single ended receiving ports. In the second embodiment, the duplexers comprise a balanced Rx port. In this embodiment, the circuit arrangement has balanced receiving ports.

In general a balanced path is less sensitive to noise and other unwanted signals coupling to signal lines in a printed circuit board. The obvious draw back is that one needs more area for the traces and more pins in both the RF IC and the RF front end. The reduction of pin count is a main advantage of the duplexers having an unbalanced Rx port, resulting in single ended receiving ports of the circuit arrangement.

However, both embodiments provide the same benefit of improved Tx to Rx and Tx to aggregated Rx isolation. The second embodiment requires two additional hybrids, which would make it physically larger then the first embodiment. The advantages of the second embodiment are its compatibility with a chip set that has balanced LNA input, e.g., for an Rx amplifier, and its noise reduction.

Each of the 90 degree hybrids provides two output signals that are phase shifted by 90 degrees relative to each other.

Each quadplexer may comprise a first port and each of the first ports of each of the quadplexers may be connected to the 90 degree hybrid which is connected to the antenna port.

Further, each quadplexer may be connected to each of the 90 degree hybrids which are connected to one of the first receiving port, the second receiving port, the first transmission port and the second transmission port.

The quadplexers and the 90 degree hybrids may be interconnected such that a signal travelling from one of the transmission ports to the antenna port constructively interferes at the antenna port.

BRIEF DESCRIPTION OF THE DRAWINGS

Further features, refinements and expediencies become apparent from the following description of the exemplary embodiments in connection with the figures.

DETAILED DESCRIPTION OF ILLUSTRATIVE EMBODIMENTS

Figure 1:
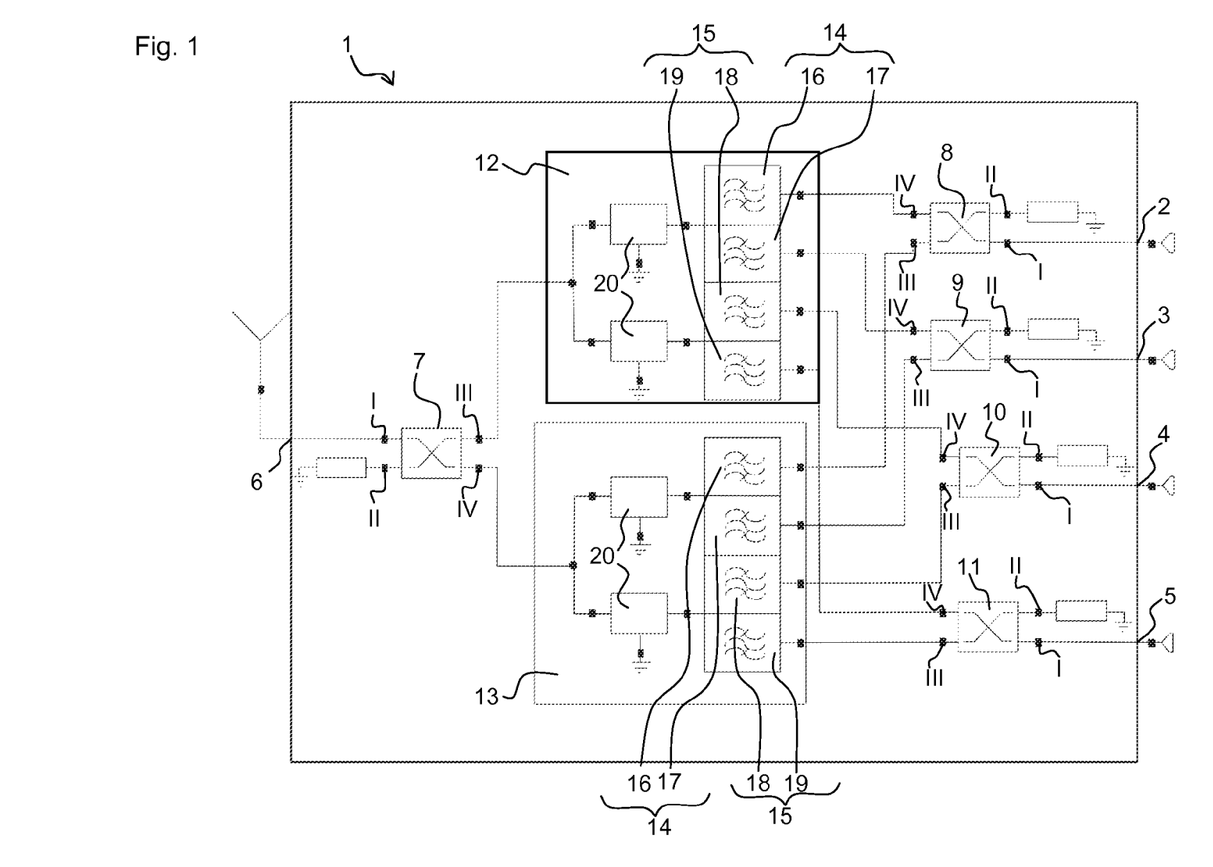
FIG. 1 shows a circuit arrangement according to a first embodiment.

FIG. 1 shows a circuit arrangement 1 according to a first embodiment. The circuit arrangement 1 comprises an antenna port 6, a first transmission port 2, a second transmission port 4, a first receiving port 3 and a second receiving port 5. The antenna port 6 is configured to be connected with an antenna. The first transmission port 2, the second transmission port 4, the first receiving port 3 and the second receiving port 5 are configured to be connected with a front-end circuit, e.g., a front-end circuit of a mobile communication device.

The first transmission port 2 and the first receiving port 3 are configured for a first frequency band. In particular, the first transmission port 2 is configured to transmit signals having frequencies in the first frequency band. The first receiving port 3 is configured to receive signals having frequencies in the first frequency band.

Further, the second transmission port 4 and the second receiving port 5 are configured for a second frequency band. In particular, the second transmission port 4 is configured to transmit signals having frequencies in the second frequency band and the second receiving port 5 is configured to receive signals having frequencies in the second frequency band.

The first and the second frequency band are different from each other. In particular, one of the first and the second frequency band may be used as a main operating band of the circuit arrangement 1. The respective other of the first and the second frequency band may be used as an aggregated band of the circuit arrangement 1. In this case, the circuit arrangement 1 allows for carrier aggregation which is used in LTE-advanced, for example.

Moreover, the circuit arrangement 1 comprises five 90 degree hybrids 7, 8, 9, 10, 11.

Each of the 90 degree hybrid 7, 8, 9, 10, 11 is configured to split an input signal into two output signals that are phase shifted relative to each other. Preferably, the two output signals are phase shifted by roughly 90 degrees relative to each other. Further, each of the 90 degree hybrid 7, 8, 9, 10, 11 is configured to combine two input signals to a single output signal wherein one of the input signals is phase shifted before the two signals are combined.

Each of the 90 degree hybrids 7, 8, 9, 10, 11 comprises a port I, a port II, a port III and a port IV. An input signal entering one of the 90 degree hybrids 7, 8, 9, 10, 11 at port I is split up into two output signals that are outputted at ports III and IV and that are phase shifted relative to each other by 90 degrees. Further, two signals that enter one of the 90 degree hybrids 7, 8, 9, 10, 11 at the ports III and IV are combined wherein one of the signals is phase shifted by 90 degrees and the combined signal is outputted at port I.

In each of the 90 degree hybrids 7, 8, 9, 10, 11, the port II is grounded via a resistance, e.g., of 50Ω. The resistance provides an impedance matching of the port II.

Moreover, each of the 90 degree hybrids 7, 8, 9, 10, 11 is connected to one of the antenna port 6, the first transmission port 2, the second transmission port 4, the first receiving port 3 and the second receiving port 5. In particular, port I of each of the 90 degree hybrids 7, 8, 9, 10, 11 is connected to one of the antenna port 6, the first transmission port 2, the second transmission port 4, the first receiving port 3 and the second receiving port 5.

Furthermore, the circuit arrangement 1 comprises two quadplexers 12, 13. Each quadplexer 12, 13 comprises a first duplexer 14 and a second duplexer 15. The first duplexer 14 is adjusted to the first frequency band. In particular, the first duplexer 14 comprises a first band pass filter 16 and a second band pass filter 17. The first pass band filter 16 forms a pass band for frequencies in a transmission band of the first frequency band. The second pass band filter 17 forms a pass band for frequencies in a receiving band of the first frequency band.

The first duplexer 14 of each of the quadplexers 12, 13 is connected to the first transmission port 2 and to the first receiving port 3. In particular, the first duplexer 14 of each of the quadplexers 12, 13 is connected to the 90 degree hybrid 8 being connected to the first transmission port 2 and to the 90 degree hybrid 9 being connected to the first receiving port 3.

More particular, the first band pass filter 16 of the first quadplexer 12 is connected to port IV of the 90 degree hybrid 8 which is connected to the first transmission port 2. Further, the first band pass filter 16 of the second quadplexer 13 is connected to port III of the 90 degree hybrid 8 which is connected to the first transmission port 2.

The second band pass filter 17 of the first quadplexer 12 is connected to port IV of the 90 degree hybrid 9 which is connected to the first receiving port 3. Further, the second band pass filter 17 of the second quadplexer 13 is connected to port III of the 90 degree hybrid 9 which is connected to the first receiving port 3.

Further, the second duplexer 15 of each of the quadplexers 12, 13 is configured for the second frequency band. In particular, the second duplexer 15 comprises a third pass band filter 18 and a fourth pass band filter 19. The third pass band filter 18 forms a pass band for frequencies in a transmission band of the second frequency band. The fourth pass band filter 19 forms a pass band for frequencies in a receiving band of the second frequency band.

The second duplexers 15 of each of the quadplexers 12, 13 are connected to the second transmission port 4 and to the second receiving port 5. In particular, the second duplexers 15 of each of the quadplexers 12, 13 are connected to the 90 degree hybrid 10 being connected to the second transmission port 4 and to the 90 degree hybrid 11 being connected to the second receiving port 5.

More particular, the third band pass filter 18 of the first quadplexer 12 is connected to port IV of the 90 degree hybrid 10 which is connected to the second transmission port 4. Further, the third band pass filter 18 of the second quadplexer 13 is connected to port III of the 90 degree hybrid 10 which is connected to the second transmission port 4.

The fourth band pass filter 19 of the first quadplexer 12 is connected to port IV of the 90 degree hybrid 11 which is connected to the second receiving port 5. Further, the fourth band pass filter 19 of the second quadplexer 13 is connected to port III of the 90 degree hybrid 11 which is connected to the second receiving port 5.

Further, each of the quadplexers 12, 13 comprises a matching structure 20. The matching structure 20 is configured to match the respective first and second duplexer 14, 15 to the antenna port 2.

Figure 2A:
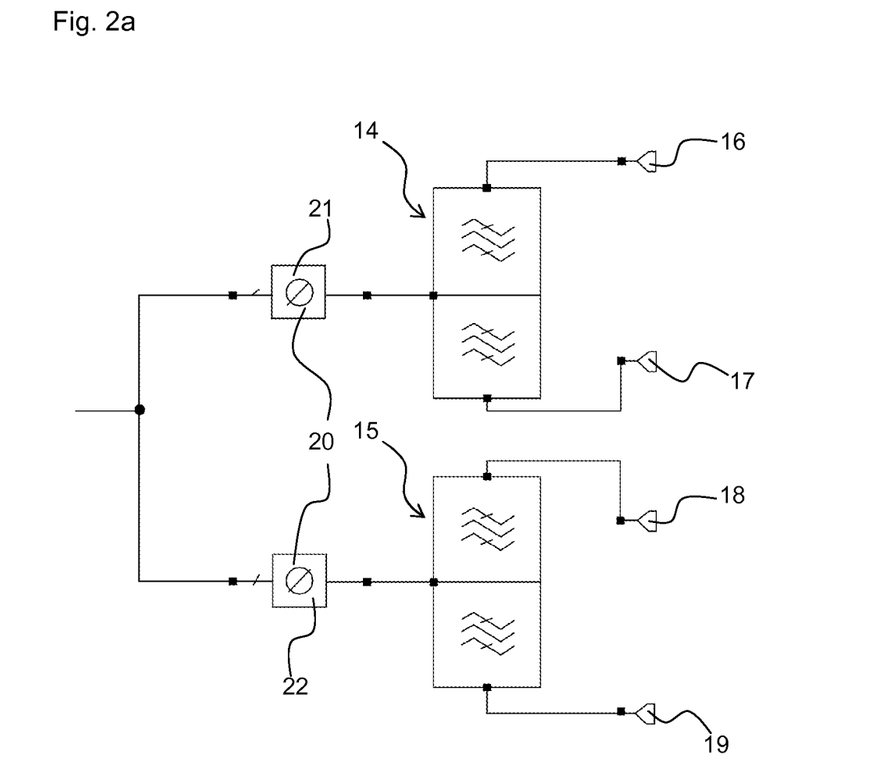
FIG. 2a shows a quadplexer.

FIG. 2a shows a more detailed view of one of the quadplexers 12, 13. The quadplexer 12, 13 comprises the first duplexer 14 and the second duplexer 15. Further, the matching structure 20 comprises a first phase shifter 21 connected to the first duplexer 14 and a second phase shifter 22 connected to the second duplexer 15. The phase shifters 21, 22 make each duplexer 14, 15 appear like a high impedance at the respective other duplexers 14, 15 pass band. The phase shifters may also provide some matching functions at the antenna port 2.

Figure 2B:
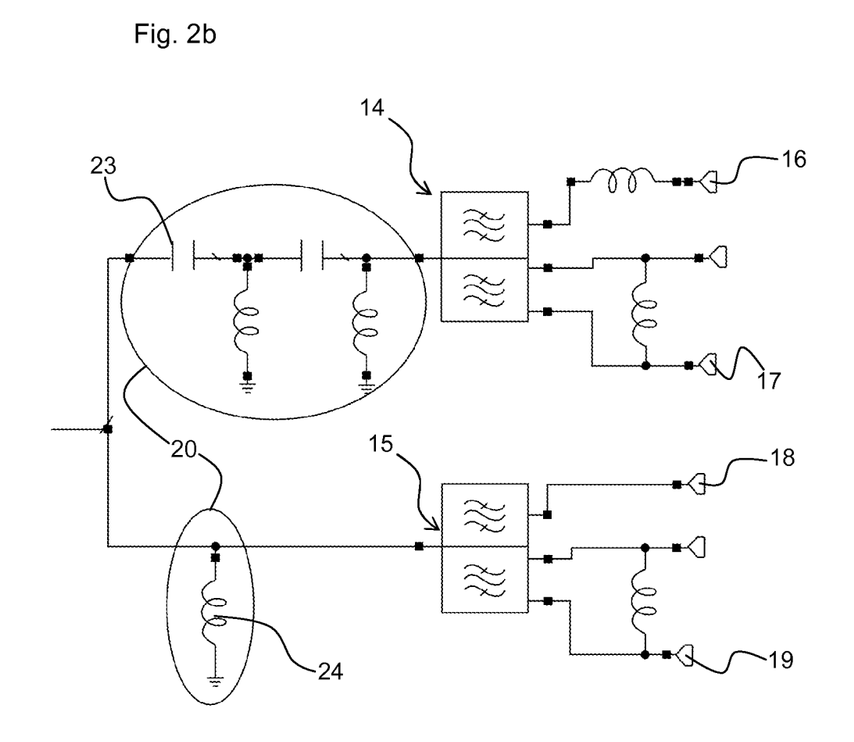
FIG. 2b shows a quadplexer.

FIG. 2b shows the matching structure 20 in more detail. The matching structure 20 comprises capacitors 23 and inductivities 24. However, the matching structure 20 may alternatively be composed of only a single coil which is connected to ground and to a signal path connecting the respective duplexer 14, 15 with the 90 degree hybrid 7 being connected with the antenna port 2.

In FIG. 2b, the first duplexer 14 is connected to a matching structure 20 providing a phase shifting and improving the matching of the duplexer. The second duplexer 15 is connected to a shunt inductor.

The circuit arrangement 1 is configured such that a signal received at the antenna port 6 is split up into two sub-signals by the 90 degree hybrid 7. The 90 degree hybrid 7 provides two output signals which travel along two different paths to the respective receiving port 3, 5 and which constructively interfere at the respective receiving port 3, 5.

Furthermore, the circuit arrangement 1 is designed such that a leakage signal traveling from one of the transmission ports 2, 4 to one of the receiving ports 3, 5 is split up into two sub-leakage signals travelling along different paths, wherein the two sub-leakage destructively interfere at the respective receiving port 3, 5 such that they cancel each other out. Thereby, the circuit arrangement 1 ensures a very good isolation between each of the transmission ports 2, 4 and each of the receiving ports 3, 5.

In particular, the circuit arrangement 1 is designed such that the isolation between the main transmission port and each of the main receiving port and the aggregated receiving port is sufficient, when the circuit arrangement 1 is used to support carrier aggregation.

In the following, an example will be discussed. First, a signal is considered which is received at the antenna port 6 and which lies in the frequency range of the receiving band of the first frequency band. The signal is split up by the 90 degree hybrid 7 which is connected to the antenna port 6. Thus, two sub-signals which are phase shifted by 90 degrees relative to each other are outputted at ports III and IV of the 90 degree hybrid 7.

The sub-signal outputted at port III is referred to as the first sub-signal in the following. Port III is connected to the first quadplexer 12 such that the first sub-signal is applied to the first duplexer 14 and the second duplexer 15 of the first quadplexer 12. The first sub-signal lies in the frequency range of the receiving band of the first frequency band. Thus, the second band pass filter 17 of the first duplexer 14 forms a pass band for the first sub-signal.

Thus, the first sub-signal is outputted by the second band pass filter 17 which is connected with port IV of the 90 degree hybrid 9 connected to the first receiving port 3.

Analogously, a second sub-signal is outputted at port IV of the 90 degree hybrid 7. The second sub-signal is phase shifted relative to the first sub-signal. Port IV is connected to the second quadplexer 13. Thus, the second sub-signal travels through the second pass band filter 17 of the second quadplexer 13 and is received at port III of the 90 degree hybrid 9 which connected to the first receiving port 3.

The 90 degree hybrid 9 combines the first and the second sub-signal wherein one of said signals is phase shifted such that the two signals are in phase. Accordingly, the two sub-signals interfere constructively with each other. Therefore, a strong signal is received at the first receiving port 3.

At the same time, an aggregated receiving signal may be received by the antenna port 6 which is in the frequency range of the receiving band of the second frequency band. Accordingly, the aggregated signal is forwarded to the second receiving port 5 by the circuit arrangement 1 in a similar way as discussed above with respect to the main signal and the first receiving port 3. In particular, the circuit arrangement 1 is designed such that the aggregated signal is split up into two sub-signals which constructively interfere with each other at the second receiving port 5.

Thus, the circuit arrangement 1 allows for two receiving paths to be active at the same time. Thereby, signals in two frequency bands can be received simultaneously. Thus, the circuit arrangement 1, thereby, supports carrier aggregation. In particular, the circuit arrangement 1 supports carrier aggregation without requiring a second antenna. Carrier aggregation allows for an increased reception bandwidth.

Moreover, at the same time, the circuit arrangement 1 ensures a very good isolation between the transmission ports 2, 4 and the receiving ports 3, 5.

In particular, it can be shown, that any leakage signal travelling from one of the transmission ports 2, 4 to one of the receiving ports 3, 5 is split up into two sub-signals which are combined by the 90 degree hybrid 9, 11 being connected with the respective receiving port 3, 5 such that the two sub-signals are phase shifted by 180° relative to each other. Thus, the two sub-signals interfere destructively with each other.

This holds true for any leakage signal travelling from a main transmission port to the main receiving port and for any leakage signal travelling from the main transmission port to the corresponding aggregated receiving port. Thereby, a very good isolation between the main transmission port and each of the main and the aggregated receiving port is realized when the circuit arrangement 1 is used to support carrier aggregation.

Figure 3:
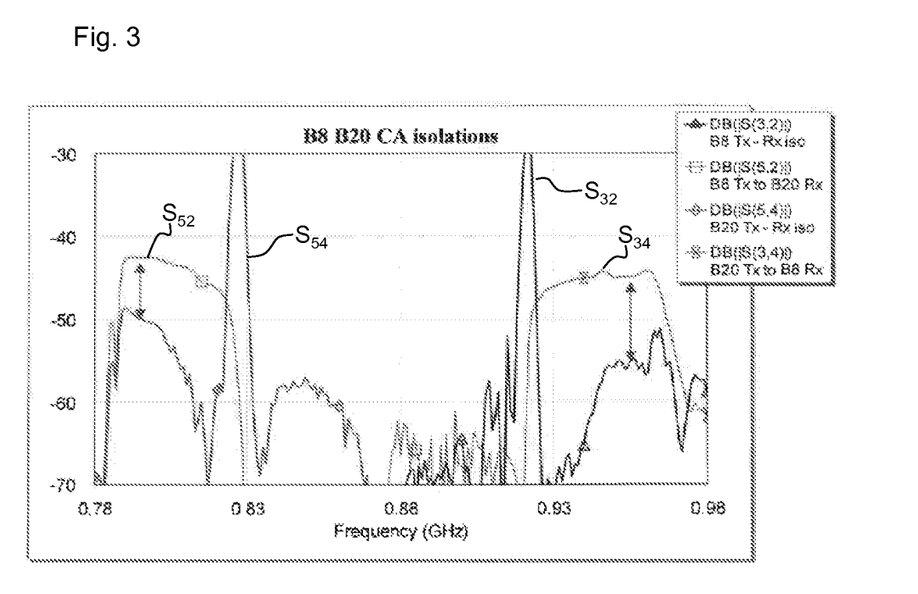
FIG. 3 shows a transmission characteristic of a single quadplexer.

FIG. 3 shows the transmission characteristic of a single quadplexer 12, 13 being combined with an antenna port 6, a first transmission port 2, a second transmission port 4, a first receiving port 3 and a second receiving port 5.

In the following example, frequency band 8 is the main band and frequency band 20 is the aggregated band.

In particular, FIG. 3 shows the Tx to Rx isolation and the Tx to aggregated Rx isolation of a single quadplexer. Line $S_{32}$ shows the transmission of the first transmission port 2 working the frequency band 8 to the first receiving port 3 also working in the frequency band 8. Further, line $S_{52}$ shows the transmission of the first transmission port 2 working the frequency band 8 to the second receiving port 5 working in the frequency band 20. Moreover, line $S_{54}$ shows the transmission of the second transmission port 4 working the frequency band 20 to the second receiving port 5 working in the frequency band 20. Furthermore, line $S_{34}$ shows the transmission of the second transmission port 4 working the frequency band 20 to the first receiving port 3 working in the frequency band 8.

It can be seen from FIG. 3 that the Tx to aggregated Rx isolation is about 5 to 10 dB worse than the duplexer's internal isolation. Thus, the isolation between the main transmission port and the aggregated receiving port is not sufficient.

Figure 4:
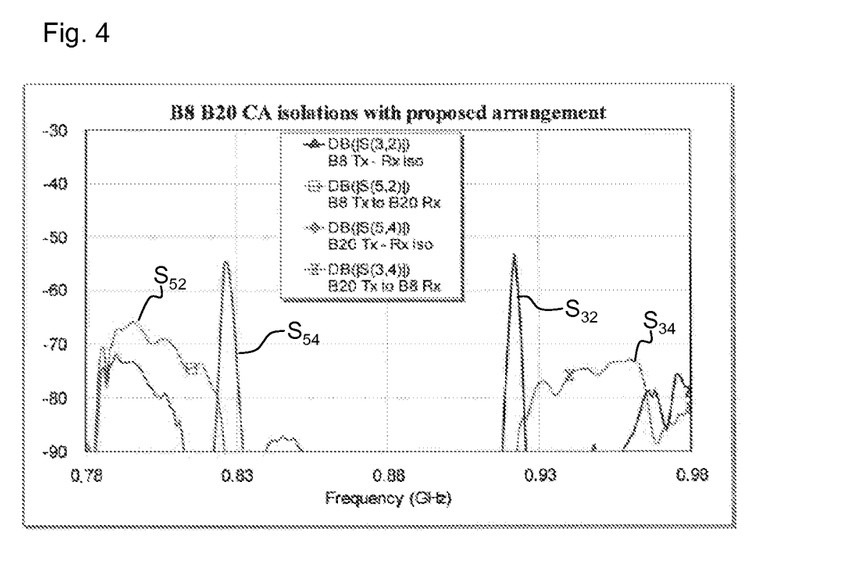
FIG. 4 shows a transmission characteristic of the circuit arrangement shown in FIG. 1.

However, the proposed circuit arrangement 1 overcomes this problem. In FIG. 4, the Tx to Rx isolation and the Tx to aggregated Rx isolation of the circuit arrangement 1 as shown in FIG. 1 is shown. In particular, FIG. 4 shows the transmission characteristic of the circuit arrangement 1 as shown in FIG. 1.

Again the lines $S_{32}$ $S_{52}$ $S_{54}$ $S_{34}$ are defined as discussed with respect of FIG. 3.

It can be seen from FIG. 4 that both the internal Tx to Rx isolation and the Tx to aggregated Rx isolation are improved by roughly 20 dB. Thus, the Tx to aggregated Rx isolation is now at a sufficient level allowing for the use of carrier aggregation.

In the first embodiment shown in FIG. 1, each of the duplexers 14, 15, 16, 17 comprises only unbalanced ports.

Figure 5:
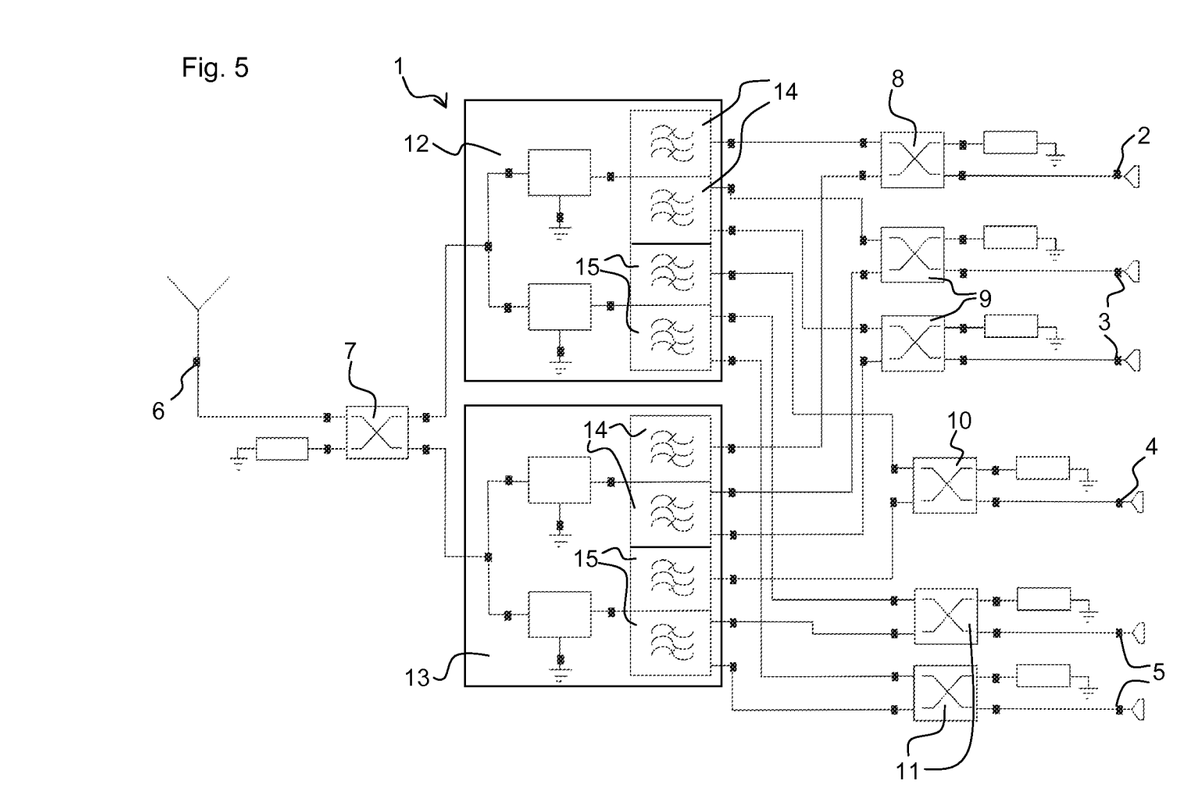
FIG. 5 shows a circuit arrangement according to a second embodiment.

FIG. 5 shows the circuit arrangement 1 according to a second embodiment. The second embodiment differs from the first embodiment as the duplexers 14, 15 comprise balanced Rx ports. Rx ports are the ports that are connected with the receiving ports 3, 5 of the circuit arrangement. According to the second embodiment, each of the first and the second receiving ports 3, 5 is balanced as well. Moreover, the circuit arrangement 1 according to the second embodiment comprises two 90 degree hybrids 9 that are connected with the first receiving port 3 and two 90 degree hybrids 11 that are connected with the second receiving port 5.

We claim:
1. A circuit arrangement comprising:
an antenna port;
a plurality of ports comprising:
   a first receiving port;
   a second receiving port;
   a first transmission port; and
   a second transmission port;

a plurality of 90 degree hybrid couplers connected to transfer an input signal into two output signals that are phase shifted relative to each other; and first and second quadplexers that each comprises a first duplexer and a second duplexer, wherein the first and second quadplexers and the 90 degree hybrid couplers are interconnected, wherein the first quadplexer comprises four filters, each filter of the four filters being interconnected with a different one of the plurality of ports through a different one of the plurality of 90 degree hybrid couplers that is interconnected between the filter and the one of the plurality of ports.

2. The circuit arrangement according to claim 1, wherein the first duplexer of both of the first and second quadplexers is tuned to a first frequency band, and wherein the second duplexer of both of the first and second quadplexers is tuned to a second frequency band that is different than the first frequency band.

3. The circuit arrangement according to claim 1, wherein:
the first transmission port is configured to transmit signals in a first frequency band;
the first receiving port is configured to receive signals in the first frequency band;
the second transmission port is configured to transmit signals in a second frequency band that is different than the first frequency band; and
the second receiving port is configured to receive signals in the second frequency band.

4. The circuit arrangement according to claim 3, wherein the first duplexer of both of the first and second quadplexers is tuned to the first frequency band and the second duplexer of both of the first and second quadplexers is tuned to the second frequency band.

5. The circuit arrangement according to claim 1, wherein a main signal receiving path is defined from the antenna port to one of the first and the second receiving ports, and wherein an aggregated signal receiving path is defined from the antenna port to the respective other of the first and the second receiving ports, the circuit arrangement being operable so that both receiving paths are active simultaneously.

6. The circuit arrangement according to claim 1, wherein:
the first quadplexer comprises a first matching structure for matching the first duplexer and the second duplexer of the first quadplexer; and
the second quadplexer comprises a second matching structure for matching the first duplexer and the second duplexer of the second quadplexer.

7. The circuit arrangement according to claim 1, wherein each of the duplexers comprises an unbalanced Rx port.

8. The circuit arrangement according to claim 1, wherein each of the duplexers comprises a balanced Rx port.

9. The circuit arrangement according to claim 8, wherein the first receiving port and the second receiving port are balanced.

10. The circuit arrangement according to claim 1, wherein the plurality of 90 degree hybrid couplers comprises:
a first 90 degree hybrid coupler connected to the antenna port;
a second 90 degree hybrid coupler connected to the first receiving port;
a third 90 degree hybrid coupler connected to the second receiving port;
a fourth 90 degree hybrid coupler connected to the first transmission port; and
a fifth 90 degree hybrid coupler connected to the second transmission port.

11. The circuit arrangement according to claim 10, wherein the first and second quadplexers each comprise a first port, and wherein each of the first ports of each of the quadplexers is connected to the first 90 degree hybrid coupler.

12. The circuit arrangement according to claim 10, wherein the first and second quadplexers are each connected to the second, third, fourth and fifth 90 degree hybrids.

13. The circuit arrangement according to claim 1, wherein the quadplexers and the 90 degree hybrids are interconnected such that a signal travelling from one of the first and second transmission ports to the antenna port constructively interferes at the antenna port.

14. The circuit arrangement according to claim 1, wherein the circuit arrangement comprises exactly five 90 degree hybrids.

15. A circuit arrangement comprising:
an antenna port;
a first receiving port;
a second receiving port;
a first transmission port;
a second transmission port;
a first quadplexer having first, second, third, fourth and fifth terminals;
a second quadplexer having first, second, third, fourth and fifth terminals;
a first 90 degree hybrid coupler having an input coupled to the antenna port, a first output coupled to the first terminal of the first quadplexer and a third terminal coupled to the first terminal of the second quadplexer;
a second 90 degree hybrid coupler having an input coupled to the first receiving port, a first output coupled to the second terminal of the first quadplexer and a second output coupled to the second terminal of the second quadplexer;
a third 90 degree hybrid coupler having an input coupled to the second receiving port, a first output coupled to the third terminal of the first quadplexer and a second output coupled to the third terminal of the second quadplexer;
a fourth 90 degree hybrid coupler having an input coupled to the first transmission port, a first output coupled to the fourth terminal of the first quadplexer and a second output coupled to the fourth terminal of the second quadplexer; and
a fifth 90 degree hybrid coupler having an input coupled to the second transmission port, a first output coupled to the fifth terminal of the first quadplexer and a second output coupled to the fifth terminal of the second quadplexer,
wherein each of the 90 degree hybrid couplers is configured to transfer an input signal applied to the input into two output signals at the first and second outputs, the two output signals being phase shifted relative to each other.

16. The circuit arrangement according to claim 15, wherein the first and second quadplexers each comprise a first duplexer and a second duplexer.

17. The circuit arrangement according to claim 16, wherein the first and second quadplexers each further comprise a matching structure coupled between the first and second duplexers and the antenna port.

18. The circuit arrangement according to claim 15, wherein the first and second quadplexers and the 90 degree hybrid couplers are interconnected such that a leakage signal travelling from one of the first and second transmission ports to one of the first and second receiving ports destructively interferes at the one of the first and second receiving ports.

\* \* \* \* \*